Aug. 12, 1969 L. M. ELLIS 3,460,210

RECORD CHANGER HOLDDOWN LATCH ASSEMBLY

Filed July 18, 1966

Inventor
Leslie M. Ellis
by Wilson & Geppert
Att'ys

United States Patent Office 3,460,210
Patented Aug. 12, 1969

3,460,210
RECORD CHANGER HOLDDOWN LATCH ASSEMBLY

Leslie M. Ellis, Capron, Ill., assignor to Keystone Consolidated Industries, Inc., a corporation of Delaware Filed July 18, 1966, Ser. No. 566,066
Int. Cl. A44b 17/00; G11b 3/60
U.S. Cl. 24—211 3 Claims

ABSTRACT OF THE DISCLOSURE

A holddown latch assembly for a resiliently mounted motorboard of a record changer where two or more latch members, each having a flange, are mounted on the base or pan of the record changer, and each latch member has a lower cylindrical portion extending into an opening in the base and an upper slightly tapered portion; the latch member having a central passage therethrough and a pair of diametrically opposite axially extending grooves in said passage. The lower end of the cylindrical portion is formed with a pair of oppositely disposed stops removed 90° from the grooves, and each groove in the tapered portion extends through the wall and has a pair of limiting shoulders adjacent the upper end, and vertically aligned converging slots merging into the grooves. A latch bolt completes the assembly and has an enlarged head and a generally cylindrical shank with a tapered free end, and a pair of diametrically opposed ribs in the free end which are received in the grooves in the latch member.

The present invention relates to a novel fastening device and more particularly to a two-position holddown latch assembly for use on a record changer of a phonograph or stereo set to allow the motorboard and turntable to be resiliently supported under normal operation, but firmly secured if the phonograph is to be transported or shipped from one location to another.

In a phonograph turntable mounting, several features are necessary for optimum operability, such as noise free connections, a free floating turntable in playing position and continued orientation in free floating position. Compression springs are utilized to support the motorboard and turntable to provide the free floating condition which is necessary where records are dropped onto the turntable during the changing operation and for the placement and removal of the tone arm. However, the turntable and motorboard must be stabilized on the cabinet during transportation of the phonograph equipment because of possible injury to the delicate mechanisms involved. The present latch assembly accomplishes this stability by securely retaining the motorboard on the base for transportation or shipping.

Among the objects of the present invention is the provision of a hold-down latching device formed of two parts which are easily and quickly assembled and disassembled and when assembled provides a connection that is free of rattle and noise which could enter the sound system of the phonograph. The device includes a latch member secured to the cabinet or base for the phonography and a reciprocable latch bolt which is mounted in the motorboard and extends into the telescopes in the latch. Both the latch and latch bolt are preferably formed of a resilient plastic material to allow for ease of assembly and disassembly.

Another object of the present invention is the provision of a hold-down latch assembly which will maintain the orientation of the motorboard and turntable relative to the cabinet or base in the floating position and will securely and positively lock the motorboard and turntable to the cabinet base for transporting or shipping. The latch assembly in its unlocked position also allows the motorboard to achieve a predetermined free floating position under the impetus of resilient means such as compression springs located between the turntable and base. The latch device has a releasable locking position which cannot be accidentally engaged or disengaged.

A further object of the present invention is the provision of a hold-down assembly for the motorboard of a turntable where the resiliency of the latch members on the cabinet or base allows for ease of assembly or disassembly of the latch bolt therein. The latch bolt includes a shaft having an enlarged head or knob at its upper end and a pair of diametrically opposed radially extending ribs or flanges which are received in grooves in the latch member. To secure the motorboard, the latch bolt is depressed and rotated 90° clockwise to move the ribs under the lower surface of the latch; the lower latch surface having detent projections and shoulders cooperating with the ribs. To unlock, the latch bolt is turned 90° counterclockwise and the springs bias the motorboard upward.

Further objects are to provide a construction of maximum simplicity, efficiency, economy and ease of assembly and operation, and such further objects, advantages and capabilities as will later more fully appear and are inherently possessed thereby.

Figures 1, 2, 3, 4, 5, 6, 7, 8:
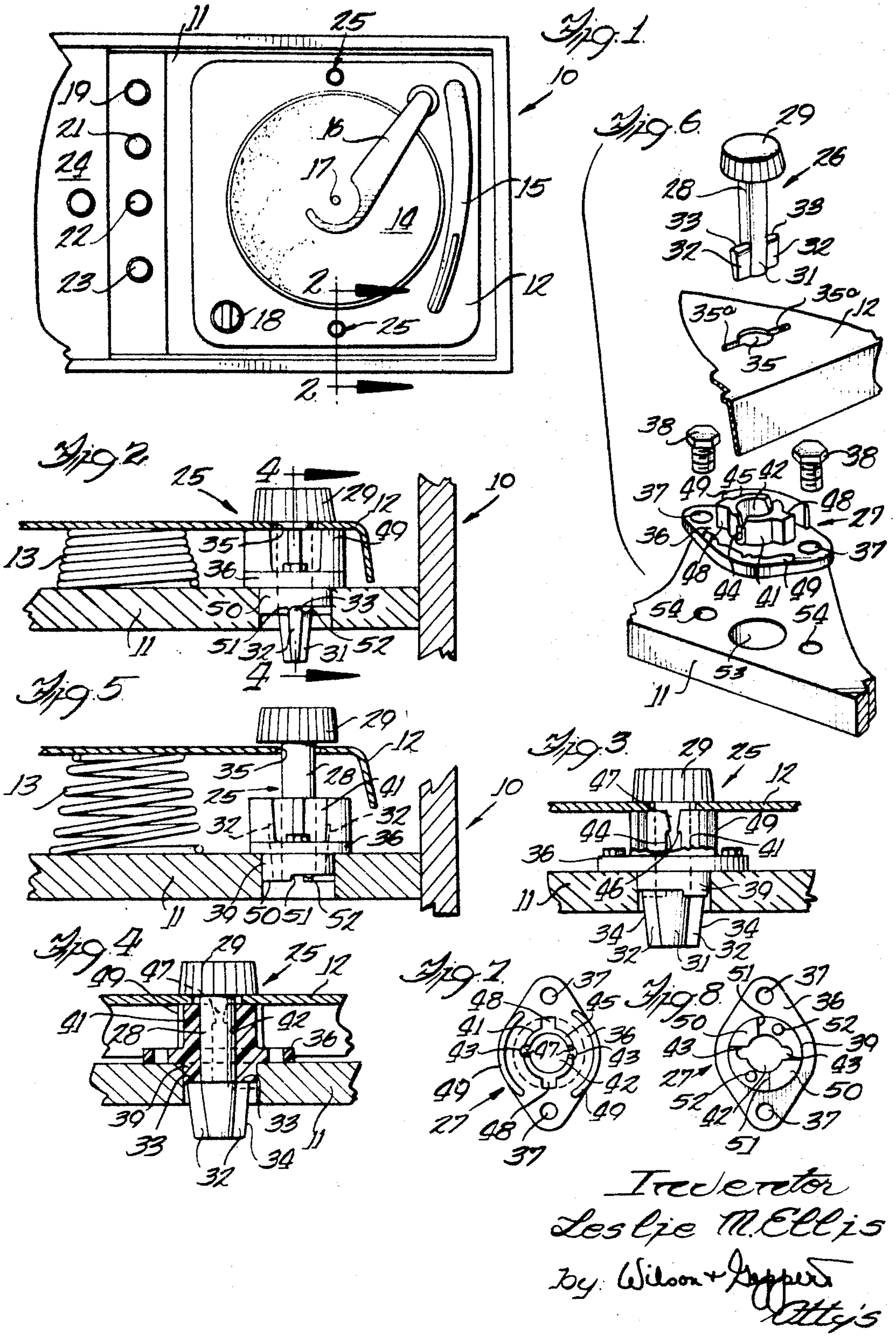
FIG. 1 is a top plan view of a phonograph incorporating a record changer in a suitable cabinet.
FIG. 2 is an enlarged vertical cross sectional view taken on the line 2—2 of FIG. 1 showing the hold-down latch assembly in locked position; the latch assembly being shown in side elevation.
FIG. 3 is a view similar to FIG. 2 but taken at a position removed 90° from the position of FIG. 2, with the front arcuate wall broken away to show the latch structure.
FIG. 4 is a vertical cross sectional view taken on the line 4—4 of FIG. 2 with the latch bolt shown in side elevation.
FIG. 5 is a view similar to FIG. 2 but showing the latch assembly in unlocked position and the motorboard in its free floating position.
FIG. 6 is an exploded perspective view of the latch assembly in a disassembled condition relative to the motorboard and cabinet base, the front arcuate wall on the latch being broken away to more clearly show the latch structure.
FIG. 7 is a top plan view of the latch member.
FIG. 8 is a bottom plan view of the latch member.

Referring more particularly to the disclosure in the drawings wherein is shown an illustrative embodiment of the present invention, FIG. 1 discloses a cabinet 10 for a phonograph or stereo phonograph incorporating a record changer which is supported on a base or pan 11 within the cabinet 10. The phonograph includes a motorboard or table 12 that is supported on the base 11 in free floating position by one or more helical compression springs 13 (see FIGS. 2 and 5); the motorboard supporting the turntable 14 and tone arm 15 as well as the arm 16 of the record changing mechanism; the spindle 17 being located on the motorboard 12. A speed selector knob 18 is also located on the motorboard 12 to control the speed of the turntable motor (not shown) that is supported underneath the motorboard.

The cabinet base or pan 11 carries a base control knob 19, treble knob 21, on-off knob 22 and volume knob 23. A sliding top 24 may be utilized to close the phonograph compartment in the cabinet 10. The springs 13 urge the motorboard upward, as seen in FIG. 5, to a predetermined free floating position. However, if the phonograph and cabinet are to be transported or shipped to another location, the motorboard cannot be maintained in its free floating position or the resulting jiggling and shocks which would occur would tend to damage the delicate mechanisms in the motor, tone arm and changer mechanism. Therefore, plural holddown latch assemblies 25 are provided to securely maintain the motorboard 12 in a fixed position on the base 11.

Each hold-down latch mechanism 25 includes a latch bolt 26 and a latch member 27; both formed of a resilient plastic material, such as nylon. The latch bolt 26 comprises a generally cylindrical elongated shank 28 having an enlarged knurled head or knob 29 at one end and a tapered end 31 at the inner end opposite the knob 29. On the tapered portion 31 are a pair of diametrically opposed radially outwardly extending ribs 32 having rounded upper ends 33 and their outer edges 34 converging parallel to the surface of the tapered end 31. The motorboard 12 has an irregular opening 35 with diametrically opposed notches 35[a] of a shape to permit the tapered end 31 and ribs 32 as well as the shank 28 to be aligned with and pass therethrough but substantially smaller than the knob 29.

The latch member 27 has a mounting flange 36 having openings 37 for suitable securing means such as bolts 38 intermediate a lower cylindrical portion 39 and a slightly tapered upper portion 41. The latch member 27 has a central cylindrical passage or opening 42 through the upper and lower portions which has a slight frictional engagement with the shank 28, with the lower portion 39 having oppositely disposed grooves 43 in the wall of the passage to receive the ribs 32 of the latch bolt 26. The grooves 43 extend up into the upper portion 41 but, because of the reduced diameter of this portion, the grooves extend completely through the side wall to form slots 44. These slots 44 are provided with shoulders 46 short of the upper end 45 of the portion 41 formed by vertically aligned converging slots 47 opening at the upper end 45 and merging into the slots 44. Strengthening ribs 48 are formed on the exterior surface of the upper portion 41 90° removed from the slots 44, and a pair of oppositely disposed arcuate walls or flanges 49 extending upward from the flange 36 to a height equal to the upper end 45 of portion 41 to support the motorboard 12 when in locked position. The walls 49 are positioned adjacent the periphery of the flange 36 and aligned with the slots 44.

The lower end of the lower portion 39 is formed with diametrically opposite projections 50 which form shoulders 51 to limit rotation of the ribs 32 on the latch bolt. These shoulders are removed approximately 90° from the grooves 43, and spaced from the shoulders 51 are spherical detent projections 52 over which the upper ends 33 of the ribs must ride in moving from unlocked to locked position.

Considering the assembly and operation of the latch device 25, an opening 53 is formed in the base 11 of the cabinet aligned with the irregular opening 35 in the motorboard to receive the lower portion 39 of the latch member 27, and pilot openings 54 are formed for the bolts 38. The ribs 32 of the latch bolt 26 are spaced from the head or knob 29 a distance substantially equal to the thickness of the motorboard 12 plus the depth of the latch member 27. The latch member 27 is aligned on the base 11 and secured thereto by the bolts 38 or other suitable securing means, and the latch bolt 26 is inserted into the irregular opening 35 and aligned with the latch member 27 so that the ribs 32 enter the converging slots 47. The latch bolt is pressed downward to spread the walls of the converging slots 47 and the ribs 32 enter the slots 44 and grooves 43.

FIG. 5 shows the motorboard 12 in its free floating position with the springs 13 urging the motorboard 12 upward and the ribs 32 on the latch bolt 26 engaging the shoulders 46 to limit upward movement of the motorboard 12. The latch bolt 26 is retained in its uppermost position due to the frictional engagement between the shank 28 of the latch bolt 26 and the wall of passage 42 in latch member 27, while the motorboard 12 is normally slightly spaced below the knob 29 in a free floating position. To securely lock the motorboard 12 to the base 11, the knobs 29 of the lock assemblies 25 are pressed downward until the motorboard 12 abuts the upper end 45 of the upper portion 41 of the latch and the walls or flanges 49, and the latch bolts 26 are then rotated clockwise approximately 90°. This action first causes the ribs 32 to be moved downward through the grooves 43 to a point just below the lower portion 39, and a rotation of the latch bolt causes the upper rounded ends 33 of the ribs 32 to pass over the detents 52 and abut the shoulders 51. Thus, the latch assembly 25 is securely locked and cannot be accidentally disengaged or unlocked. To unlock, the latch bolt 26 is rotated approximately 90° counterclockwise by manually rotating the knob 29, and the springs 13 then urge the motorboard 12 to its free floating position.

To disassemble the latch assembly 25, the latch bolt 26 is pulled upward until it separates from the latch member 27 due to the resiliency of the material. The motorboard and turntable are then free for servicing.

While this latch assembly has been shown and described as being advantageously applicable to a record changer, it is not my desire or intent to unnecessarily limit the scope or the utility of the improved features by virtue of this illustrative embodiment.

Having thus disclosed my invention, I claim:

1. A latch assembly for releasably securing a resiliently biased member to a base where spring means between said member and said base bias the member to a free floating position, comprising a latch member formed of a resilient material and including a lower cylindrical portion, an upper slightly tapered portion and a mounting flange therebetween to secure the latch member to the base, said latch member having a central passage therethrough and oppositely disposed axially extending the full length of the lower portion of said passage, said grooves being continued in said upper portion and extending through the wall thereof to provide opposed slots terminating in limiting shoulders spaced below the upper end of said latch member, said upper portion having a pair of converging slots extending from the upper end of the upper portion and vertically aligned with and merging into said opposed slots and limiting shoulders, a pair of shoulders on the lower end of the latch member removed approximately 90° from said grooves and a pair of detents spaced from the last mentioned shoulders, and a latch bolt insertable into said latch member and adapted to be moved therein between an unlatched and a latched position, said latch bolt including a cylindrical shaft received in said central passage with an enlarged knob at one end above the resiliently biased member and a tapered opposite end, and a pair of diametrically oppositely disposed ribs on said tapered end and spaced from said knob a distance substantially equal to the thickness of said resiliently biased member plus the depth of said latch member so that said ribs can be projected through the grooves and under the lower surface of the latch member when the latch bolt is depressed with said resiliently biased member abutting the latch member, said ribs having rounded upper ends and outer edges parallel to the tapered surface of the tapered end, said rounded ends urged over said detents so that the ribs abut the shoulders on the lower surface of the latch member when the latch bolt is fully depressed and rotated relative to the latch member to latch the latch bolt therein, said ribs cooperating with said limiting shoulders in the unlatched position of the latch bolt to normally limit upward movement of the latch bolt relative to the latch member under the impetus of the resiliently biased member.

2. A latch assembly as set forth in claim 1, in which said ribs are tapered from the rounded ends to the lower edges thereof, and said latch bolt and latch member are assembled by locating the ribs of the latch bolt in the converging slots and depressing the latch bolt so that the resiliency of the latch member will allow spreading of the limiting shoulders to allow the ribs to enter the slots therein below the limiting shoulders, and the latch bolt and latch member are disassembled from the unlatched position of the latch bolt by exerting an upward force so that the resiliency of the latch member will allow the rounded ends of the ribs to cam the limiting shoulders outwardly to release the latch bolt therefrom.

3. A latch assembly as set forth in claim 1, including a pair of oppositely disposed strengthening ribs on the exterior surface of said upper tapered portion of the latch member removed 90° from said grooves and a pair of oppositely disposed arcuate walls extending upward from said mounting flange and aligned with said grooves, said arcuate walls being outwardly spaced from said upper tapered portion of the latch member and the upper edges of said walls correspond in height to said upper tapered portion.

References Cited

UNITED STATES PATENTS 2,922,211 1/1960 Boyd ---------------- 24—221

FOREIGN PATENTS 1,002,827 9/1965 Great Britain.

LEONARD FORMAN, Primary Examiner

F. J. D'AMBROSIO, Assistant Examiner

U.S. Cl. X.R.

274—39